United States Patent [19]
Williams

[11] Patent Number: 6,082,929
[45] Date of Patent: *Jul. 4, 2000

[54] WASTE CONTAINMENT SYSTEM AND METHOD FOR THE RECLAMATION OF LANDFILL AND WASTE AREAS

[76] Inventor: Jerald R. Williams, 120 Rachel Way, Athens, Ga. 30605

[*] Notice: This patent is subject to a terminal disclaimer.

[21] Appl. No.: 09/019,666

[22] Filed: Feb. 6, 1998

Related U.S. Application Data

[63] Continuation-in-part of application No. 08/846,561, Apr. 30, 1997, Pat. No. 5,915,881
[60] Provisional application No. 60/037,837, Feb. 6, 1997.

[51] Int. Cl.⁷ .................. B09B 1/00; G21F 9/00
[52] U.S. Cl. .................. 405/129; 405/128; 405/263; 588/250; 588/259
[58] Field of Search .................. 405/128, 129, 405/263, 270; 588/250, 259; 210/901

[56] References Cited

U.S. PATENT DOCUMENTS

| | | | |
|---|---|---|---|
| 3,016,713 | 1/1962 | Deming | 405/264 |
| 3,586,624 | 6/1971 | Larson | 405/129 X |
| 3,732,697 | 5/1973 | Dickson | 405/129 |
| 3,772,893 | 11/1973 | Eilers | 405/264 |
| 3,986,365 | 10/1976 | Hughes | 405/264 |
| 4,166,709 | 9/1979 | Valiga | 405/128 |
| 4,362,434 | 12/1982 | Valiga et al. | 405/128 |
| 4,430,021 | 2/1984 | Wagner et al. | 405/129 |
| 4,473,477 | 9/1984 | Beall | 210/747 X |
| 4,501,788 | 2/1985 | Clem | 405/107 X |
| 4,519,902 | 5/1985 | Kinder | 209/234 |
| 4,902,167 | 2/1990 | Shelton | 405/128 |
| 4,908,129 | 3/1990 | Finsterwalder et al. | 210/901 X |
| 5,112,665 | 5/1992 | Alexander | 428/102 |
| 5,161,915 | 11/1992 | Hansen | 405/129 |
| 5,192,163 | 3/1993 | Fleming | 405/128 |
| 5,346,566 | 9/1994 | White | 405/270 X |
| 5,354,149 | 10/1994 | Breaux | 405/128 |
| 5,389,166 | 2/1995 | White | 405/270 X |
| 5,426,079 | 6/1995 | Hughes | 502/80 |
| 5,427,990 | 6/1995 | Hughes | 502/80 |
| 5,439,317 | 8/1995 | Bishop et al. | 405/128 |
| 5,454,668 | 10/1995 | Liao | 405/117 |
| 5,476,142 | 12/1995 | Kajita | 166/294 |
| 5,710,362 | 1/1998 | Vesilind et al. | 588/259 |
| 5,915,881 | 6/1999 | Williams | 405/129 |

*Primary Examiner*—Eileen Dunn Lillis
*Assistant Examiner*—Jong-Suk Lee
*Attorney, Agent, or Firm*—Thomas, Kayden, Horstemeyer & Risley, L.L.P.

[57] ABSTRACT

A waste containment system utilizing a manufactured soil useful for the remediation of waste disposal sites for municipal and industrial waste products. To form the manufactured soil, conditioned clay materials, in particular bentonite clay, are mixed with sand and water to form a colloidal suspension. The mixture can be either placed into trenches, as a slurry, to form vertical barriers or allowed to de-water and then spread and compacted to create surface caps and/or sub-surface liners. Normally, the a containment system includes an imbedded sand drainage layer so as to make the composite system impervious to air and water penetration. The percentage of clay in the manufactured soil is varied depending on installation site characteristics and desired performance standards. Manufactured soil with as little as approximately 1% to 3% clay (dry wt.) can be made to achieve and maintain hydraulic conductivities as low as $1.7 \times 10^{-9}$ cm/sec.

18 Claims, 1 Drawing Sheet

6,082,929

WASTE CONTAINMENT SYSTEM AND METHOD FOR THE RECLAMATION OF LANDFILL AND WASTE AREAS

CROSS-REFERENCE TO RELATED APPLICATIONS

Applicant hereby claims priority to and incorporates by reference U.S. provisional Patent Application Ser. No. 60/037,837, filed Feb. 6, 1997, as well as U.S. patent application Ser. No. 08/846,561, filed Apr. 30, 1997, published as U.S. Pat. No. 5,915,881, on Jun. 29, 1999, the present application being a continuation-in-part of the latter application.

FIELD OF THE INVENTION

The present invention relates generally to the field of landfill waste disposal systems and more specifically to a method of manufacturing a soil product to be used in constructing capping systems for landfills which meet or exceed specifications of local, state, and federal environmental regulation agencies.

BACKGROUND OF THE INVENTION

The disposal of municipal and industrial waste products is an extremely important issue that is receiving a great deal of attention. The problem of waste disposal involves not only the development of adequate techniques and means for handling these wastes, but also the correction of serious problems that have been created due to past improper and unsafe practices. Serious contamination of the environment has resulted from the lack of knowledge of, or lack of desire to implement, effective methods for the disposal, storage, and containment of these undesirable waste products. The problem is magnified many fold by the great number of disposal sites existing today and the large size of these sites.

In situations in which on-line or in-situ processing is either not technically feasible or overly cost prohibitive, attempts have been made to contain the wastes by creating isolation covers for the waste piles. Although this course of action has been pursued at many waste sites, all too often these isolation covers fail to prevent the escape of contaminants.

In an effort to develop more effective covers for waste areas, the unique characteristics of water-swellable clays have been used extensively. The mineral sodium montmorillonite, generally known as sodium bentonite, is one such clay. As reported in the publication Science, Feb. 23, 1996, S. Karaborni, et al. write, "Clays have a characteristic layered structure. Between these layers, water can absorb, resulting in strong repulsive forces that cause the clays to expand to as much as several times their original thickness. Clay hydration studies have been conducted since 1933, yet there is no clear understanding of the swelling mechanism." Nevertheless, water-swelling clays have been used by the industry in a number of products and in a variety of applications.

In soil sealing applications, bentonite clays have been mixed with other ingredients in both wet and dry conditions. For instance, in U.S. Pat. No. 3,016,713, issued to Deming, a method for treating soil surfaces with an aqueous slurry of a lattice clay (bentonite) and an additive of a water-soluble anionic polyelectrolyte is described as rendering the walls and bottoms of stock ponds and other water reservoirs impervious to seepage or other leaking. U.S. Pat. No. 3,986,365, issued to Hughes, teaches a soil sealing method in which an amount of a particular water-soluble polymer is added to a dry bentonite-soil admixture whereby the polymer addition decreases the amount of bentonite necessary to form a water-containing soil enclosure. U.S. Pat. No. 3,772,893, issued to Eilers, teaches a soil sealing method used to reduce the permeability of soil solids to water by admixing a dry mixture of an expanding lattice clay and a linear water soluble organic polymer to a layer of soil. The soil layer is then compacted using ASTM D 698-91 procedures.

Bentonite clays have also been used as water barrier elements in geosynthetic fabric liners. These liners typically consist of a layer of dry bentonite clay sandwiched between two non-woven geotextile fabrics. This technology is described in U.S. Pat. No. 5,346,566, issued to White, and U.S. Pat. No. 5,112,665, issued to Alexander. Geosynthetic clay liners of this type are being used in landfill covers as water barriers to eliminate the need of a compacted clay layer. Although these liners, when compared with compacted clay, have low hydraulic conductivity specifications and are usually cost competitive, seam integrity can be a problem and installation costs can be excessive.

The use of compacted clay covers has been a traditional method of complying with the requirements of the U.S. Environmental Protection Agency. Normally, a three layer system is used for the formation of such covers. In such systems, a top vegetative layer, an intermediate drainage layer, and a clay bottom layer are used. The bottom layer is typically a compacted clay that comprises native soil mixed with dry bentonite clay in a concentration of at least 5% by weight. Although compaction of this layer to a point slightly wet of optimum initially achieves adequate hydraulic conductivity, conventional clay covers have been shown to be vulnerable to desiccation cracking, especially when they are installed in arid environments. Such cracking drastically reduces the effectiveness of the cover and can even result in total cover failure. In addition to having such cracking problems, compacted clay covers of this type are usually expensive and difficult to construct.

Because of the inadequacies of current state-of-the-art environmental protection measures, various governmental agencies are actively engaged in programs directed toward the improvement of environmental restoration and management technologies. Accordingly, it can be appreciated that it would be desirable to have a waste containment system which effectively prevents contamination of the surrounding environment that is neither vulnerable to failure nor cost prohibitive.

SUMMARY OF THE INVENTION

Briefly described, the present invention relates to a waste containment system for the bioremediation and natural attenuation of contaminated waste sites. The containment system comprises a waste cover or cap that forms a seal on the surface of the waste to isolate and contain the waste above ground. Typically, the cap comprises three individual layers: a surface layer, an intermediate layer, and a sealing layer. The surface layer is a vegetative layer composed of a low clay content soil used to support plant growth of vegetation, the intermediate layer is a highly permeable sand layer that is designed to horizontally divert water, and the sealing layer, which rests directly upon the waste material, is a manufactured soil that typically has a conditioned clay content of approximately 0.5% to 5%, and a moisture content of about 8% to 15%.

Usually, the manufactured soil takes the form of a hydrated clay solution made by adding sodium bentonite, having a minimum clay content of approximately 80%, with water in a ratio of approximately 8% to 25% sodium bentonite and approximately 92% to 75% water by weight. This solution is then mixed with sand material having fine, medium, and coarse grained particles. Currently deemed acceptable is river, eolian, or glaciated sand, or sandy soil comprised of sand, silt, and clay-sized particles. The ratio of clay solution to the sand mixture will typically range from approximately 0.5% to 5% by weight. Additional water is usually then added, in an amount approximately 15% to 35% by weight, to create a pumpable slurry that can be spread over the top of the waste material, or de-watered to form the manufactured soil which can be transported to an on-site area and spread atop the waste material. When the latter method is used, the soil is suitable for movement and/or compaction when the moisture content decreases to fall within a range of approximately 8% to 15% by weight.

In a preferred arrangement, the containment system also includes vertical walls or barriers that are similarly composed of the manufactured soil described above. Generally, the barriers form a continuous barrier that follows the perimeter of the waste material and extends below the ground surface. Additionally, the containment system can include a sub-surface liner also constructed of the manufactured soil. Where each of the cap, vertical barriers, and sub-surface liner are used, the waste material of the site can be completely encapsulated to provide maximum protection against contamination of adjacent soil and air.

DETAILED DESCRIPTION OF THE INVENTION

The present invention relates to a waste containment system for the bio-remediation and natural attenuation of contaminated sites. As will be described below, this invention uses clay slurry technology and a set of established engineering principles and equipment (pug-mills, slurry pumps, compactors, etc.) to achieve this remediation. According to the system, a manufactured soil, currently marketed under the trademark ClayCrete™, is layered with overlying sand to create a containment barrier substantially impervious to air and water penetration due to the low permeability of the manufactured soil. This containment system can be effectively utilized at a variety of types of waste sites, including: oxidized mine tailings, industrial and municipal waste disposal sites, contaminated soils and sediments, fly-ash disposal sites, and the like.

Figure 1:
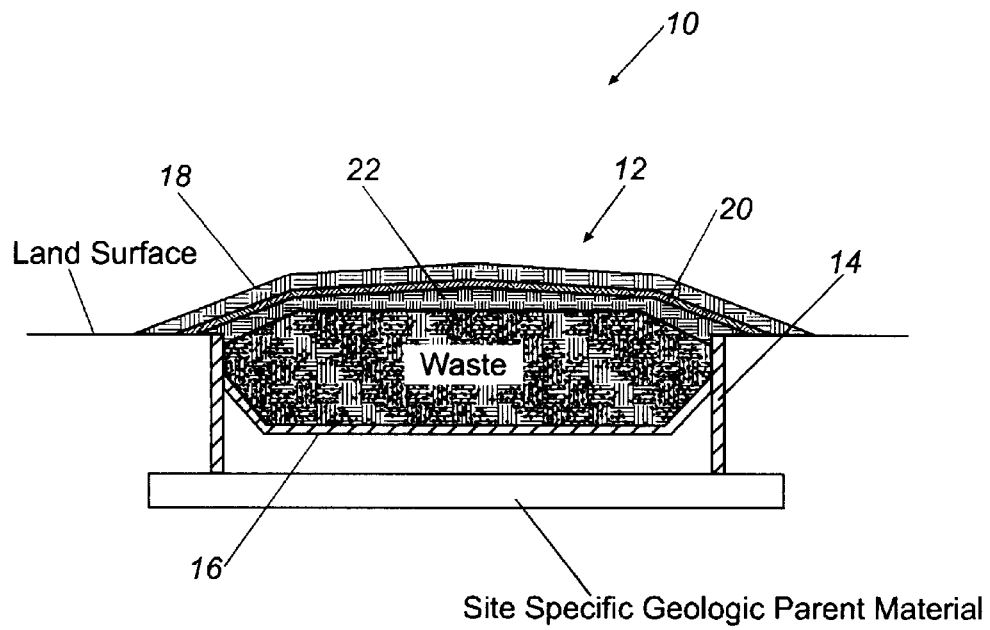
FIG. 1 is a cross-sectional view of an example arrangement of the waste containment system of the present invention shown installed at a waste site.

Depending on local conditions at a particular site, various modifications of the waste containment system can be used. Referring to the figures, in which like numerals indicate like elements through the views, FIG. 1 illustrates an example arrangement of the waste containment system 10 of the present invention. Specifically, FIG. 1 depicts a waste site that is completely encapsulated by the containment system in which waste material is stored both above and below ground. The primary component of the system 10 is a waste cover or cap 12 which forms a seal on the surface of the waste to isolate and contain the waste above ground.

Figure 2:
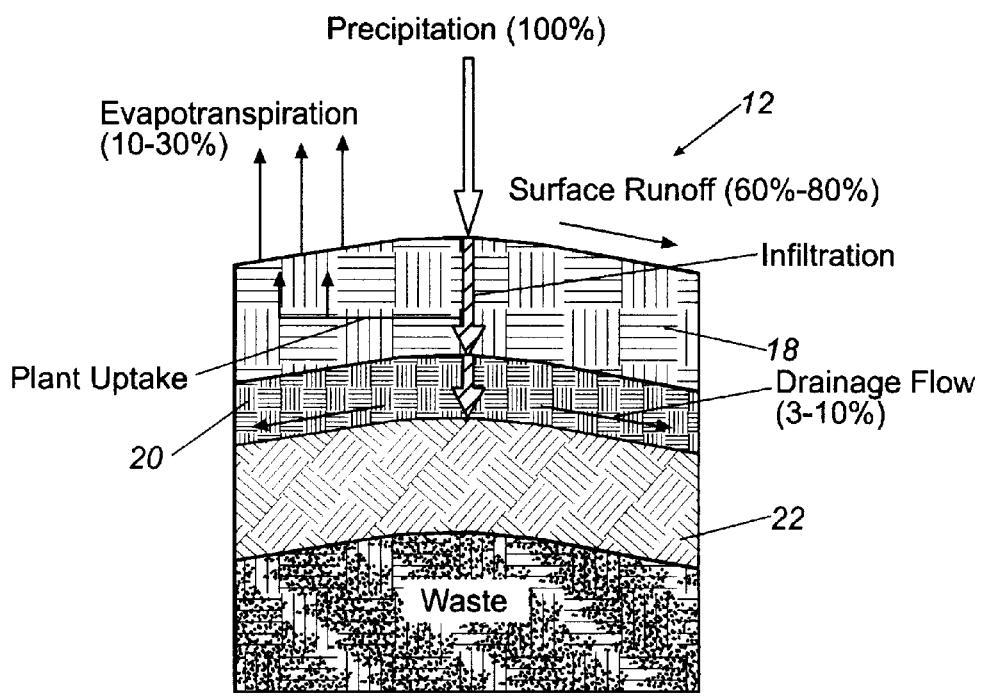
FIG. 2 is an enlarged cross-sectional view of the waste cover of the containment system shown in FIG. 1.

As illustrated most clearly in FIG. 2, the waste cap 12 typically comprises three individual layers: a surface layer 18, an intermediate layer 20, and a sealing layer 22. The surface layer 18 is a vegetative layer composed of a low clay content soil that is used to support plant growth of grasses and the like. The intermediate layer is a highly permeable sand layer that is designed to divert water horizontally to reduce the amount of water that will directly impinge the sealing layer 22. The sealing layer rests directly upon the waste material and is composed of a manufactured soil that has a conditioned clay content of approximately 0.5% to 5%, and a moisture content of about 8% to 15%.

Typically, the manufactured soil of the sealing layer is formed in a two step process. According to this process, a hydrated clay solution is made by adding sodium bentonite, having a minimum clay content of approximately 80%, with water in a ratio of approximately 8% to 25% sodium bentonite and approximately 92% to 75% water by weight. This solution is then mixed thoroughly until it has the consistency of dense mud. Next, this hydrated clay or mud solution is mixed with sand having fine, medium, and coarse grained particles. Currently deemed acceptable is river, eolian, or glaciated sand, or sandy soil comprised of sand, silt, and clay-sized particles. The ratio of clay solution to the sand mixture will typically range from approximately 0.5% to 5% by weight, depending on the degree of permeability desired. The sand and clay are mixed until homogeneous colloidal suspension is formed. Additional water is then added, in an amount approximately 15% to 35% by weight, to create a pumpable slurry that can be spread over the top of the waste material and allowed to de-water to form the sealing layer. Alternatively, the slurry can be pumped onto an off-site area and allowed to de-water to form a granular manufactured soil that can later be transported to an on-site area and spread atop the waste material. When the latter method is used, the soil is suitable for movement and/or compaction when the moisture content decreases to fall within a range of approximately 8% to 15% by weight.

Below ground level, the containment system 10 includes vertical walls or barriers 14 that further decrease the risk of horizontal movement of water and contaminants. Similar to the sealing layer 22, these vertical barriers 14 are composed of the manufactured soil described above. The specific configuration of the vertical barriers will vary depending upon the particulars of the waste site. Generally speaking, however, the barriers will form a continuous barrier that follows the perimeter of the waste material and extends approximately 50 to 100 feet below the ground surface. The barriers can be formed by pumping the manufactured material, in slurry form, into vertical trenches formed in the ground, or by filling these trenches with the de-watered manufactured soil.

At newly constructed waste disposal sites, the containment system can further include a sub-surface liner 16 also constructed of the manufactured soil of the present invention. To construct a sub-surface waste liner, the manufactured soil is spread and compacted using ASTM D 698-91 but with moisture content being controlled to a nominal value of approximately 8% to 15%. It will be understood that, although described as comprising a waste cap, barriers, and a sub-surface liner, the containment system of the present invention can comprise any one of the above described components individually, or in any combination, to suit the particular needs of the site in which the system will be implemented. In situations in which each of the cap, vertical barriers, and sub-surface liner are used, the waste material of the site can be completely encapsulated to provide maximum protection against contamination of adjacent soil and air.

To illustrate the extremely low hydraulic conductivity exhibited by the manufactured soil used to construct the sealing cap, vertical barriers, and sub-surface liner, clay and sand mixtures having various percentages of clay were prepared using a motorized overhead paddle. The resulting slurries were placed into 10.2 cm diameter permeameters to a thickness of 3 cm. Water with a 22 cm head was introduced and the hydraulic conductivity was measured by a falling head method to calculate the saturated hydraulic conductivity, K. Sand material with no added clay was used as a control, and replicate treatments (3 for each clay/sand treatment) were added Measurements were made over a ten day period. As is evident from Table 1, the recorded data indicate very low values of hydraulic conductivity and show significant improvement in hydraulic conductivity up to 4% clay content before leveling-off.

TABLE 1

| % Clay (by weight | 0% | 1% | 2% | 3% | 4% | 5% |
|---|---|---|---|---|---|---|
| Mean K (cm/sec) | $5.2 \times 10^{-4}$ | $6.5 \times 10^{-7}$ | $2.8 \times 10^{-7}$ | $1.9 \times 10^{-7}$ | $1.0 \times 10^{-7}$ | $1.0 \times 10^{-7}$ |

To test for resistance to desiccation cracking, the clay/sand slurries were poured into 8 cm diameter containers which were placed into a controlled oven. The temperature was maintained at 48° C. for a period of three days. At the end of this time period, no discernible cracking was observed in any of the mixtures, confirming the generally accepted notion that the clay content of soil must be greater than about 6% or 7% before desiccation cracking occurs.

Various samples of manufactured soil were prepared, compacted, and tested to determine the variation in hydraulic conductivity as amounts of clay versus moisture content of the compacted soil were varied. The saturated hydraulic conductivities are shown in Table 2 and the data exhibit that clay/sand mixtures containing as little as approximately 1% to 3% of clay per dry weight and a compacted moisture content of approximately 9% possess a hydraulic conductivity of about $1.7 \times 10^{-9}$ cm/sec.

TABLE 2

| Trial | Clay, % | Moisture, % | K (cm/sec)[a] |
|---|---|---|---|
| 1 | 0 | 2 | $2.5 \times 10^{-3}$ |
| 2 | 2 | 16 | $2.4 \times 10^{-8}$ |
| 3 | 2 | 14 | $1.7 \times 10^{-8}$ |
| 4 | 2 | 14 | $1.8 \times 10^{-8}$ |
| 5 | 2 | 14 | $1.7 \times 10^{-8}$ |
| 6 | 2 | 9 | $1.7 \times 10^{-9}$ |
| 7 | 4 | 35 | $4.2 \times 10^{-8}$ |
| 8 | 4 | 26 | $2.7 \times 10^{-8}$ |
| 9 | 4 | 15 | $8.0 \times 10^{-9}$ |
| 10 | 4 | 9 | $3.9 \times 10^{-8}$ |
| 11 | 3 | 9 | $2.8 \times 10^{-9}$ |

[a]Measured by the falling head method (Hillel, 1980)

Other hydraulic conductivity measurements obtained in laboratory tests are shown in Table 3. Specially, the data in table three was obtained through a double ring permeameter method in which the material sample is pressurized and the hydraulic conductvity determined.

TABLE 3

| Clay % | Material | K, (cm/sec) |
|---|---|---|
| 0 | sand only | $2.5 \times 10^{-3}$ |
| 1 | clay/sand slurry | $6.1 \times 10^{-7}$ |
| 1 | manufactured soil | $4.1 \times 10^{-8}$ |
| 2 | clay/sand slurry | $1.1 \times 10^{-7}$ |
| 2 | manufactured soil | $1.4 \times 10^{-9}$ |

Depending on the specific performance factors desired from the containment system of the present invention, it is to be noted that additional drainage and sealing layered can be installed. However, due to the substantial difference in hydraulic conductivity between the intermediate sand layer 20 and the sealing layer 22, an anisotropic barrier is created which contributes to a very low overall system permeability. As a result, the waste containment system is, for all practical purposes, impervious to the penetration of water and oxygen without the need of additional layers. Typically approximately 60% to 80% of the precipitation received is deflected from the system face runoff, and up to approximately 30% escapes into the atmosphere through evapo-transpiration. The percentage of infiltration water that penetrates through the surface layer is either taken up through plant roots or removed by lateral drainage flow through the intermediate sand layer. Because of its unique formulation, virtually no water percolates through the manufactured soil sealing layer, thus little or no water reaches the contained waste. Since water flow into the waste material is substantially eliminated, water and contaminant outflow from the site does not usually occur.

To facilitate the installation of a comprehensive waste containment system, note that the manufactured soil of the present invention is compatible with the venting systems that release any gases that might be generated by the contained waste. Additionally, the formulation and method of manufacturing the present manufactured soil produces a product that has elastic and self-sealing characteristics. This is important to ensure that barrier integrity is maintained even though shifting of the containment system may occur over time due to the settling of the waste material.

For the purposes of landscaping and erosion control, re-vegetation of the waste cap surface is an integral part of the present containment system. However, even with vigorous plant growth, the integrity of the cap is maintained because the underlying sealing layer acts as a bio-barrier to root penetration in that roots cannot penetrate densely consolidated materials that lack available water.

While preferred embodiments of the invention have been disclosed, it will be under stood by those having ordinary skill in the art that many variations and modifications can be made without substantially departing from the principles of the present invention. All such variations and modifications are intended to be included herein within the scope of the present invention, as set forth in the following claims.

What is claimed is:

1. A waste containment system for preventing waste contaminants of waste material from escaping from waste sites to the surrounding environment, said waste containment system comprising a waste cap including a sealing layer comprised of a granular manufactured soil, said granular manufactured soil composed of a hydrated sodium bentonite clay solution and sand material, wherein said sealing layer extends across the waste material of the waste site and is substantially impervious to water and air such that contaminants contained within the waste material cannot escape to the surrounding environment.

2. The waste containment system of claim 1, wherein said waste cap further includes a highly permeable sand layer formed over said sealing layer, said sand layer being designed to divert water horizontally away from said sealing layer to reduce the amount of water that can directly impinge said sealing layer.

3. The waste containment system of claim 2, wherein said waste cap further includes a surface layer formed over said sand layer, said surface layer being a vegetative layer composed of a low clay content soil and used to support plant growth.

4. The waste containment system of claim 1, wherein the hydrated sodium bentonite clay solution is composed of approximately 8% to 25% sodium bentonite and approximately 92% to 75% water by weight.

5. The waste containment system of claim 1, wherein said sand material is contained in said clay solution in a ratio of approximately 0.5% to 5% by weight.

6. The waste containment system of claim 1, wherein said sodium bentonite has a minimum clay content of approximately 80%.

7. The waste containment system of claim 1, wherein said sand material is river, eolian, or glaciated sand, or sandy soil comprised of sand, silt, and clay-sized particles.

8. The waste containment system of claim 1, wherein said manufactured soil has a moisture content of approximately 8% to 15% by weight.

9. The waste containment system of claim 1, further comprising vertical barriers, said barriers being composed of said manufactured soil and forming a continuous barrier that follows the perimeter of the waste material underground.

10. The waste containment system of claim 1, further comprising a sub-surface liner composed of said manufactured soil and extending underneath the waste material.

11. A method of creating a waste containment system for waste material, said method comprising the steps of:

forming a hydrated clay solution comprising sodium bentonite with water;

mixing the clay solution with sand material to form a clay and sand mixture;

adding water to the clay and sand mixture to form a clay and sand slurry; and de-watering the clay and sand slurry to form a granular manufactured soil capable of being transported to a waste site and spread atop, aside, or underneath the waste material to prevent waste contaminants from escaping to the surrounding environment.

12. The method of claim 11, wherein the hydrated clay solution has a composition of approximately 8% to 25% sodium bentonite and approximately 92% to 75% water by weight.

13. The method of claim 11, wherein the sand material is mixed into the clay solution in a ratio of approximately 0.5% to 5% by weight.

14. The method of claim 11, wherein the water is added to the clay and sand mixture in an amount approximately 15% to 35% by weight.

15. The method of claim 11, wherein the sodium bentonite has a minimum clay content of approximately 80%.

16. The method of claim 11, wherein the sand material is river, eolian, or glaciated sand, or sandy soil comprised of sand, silt, and clay-sized particles.

17. The method of claim 11, wherein the moisture content of resultant manufactured soil formed by the method is approximately 8% to 15% by weight.

18. The method of claim 11, further comprising the step of compacting the soil in place at the waste site to form a waste sealing layer.

* * * * *